United States Patent [19]

Loncin

[11] 3,874,925

[45] Apr. 1, 1975

[54] PROCESS FOR EXTRACTING SUGAR FROM SUGAR-CONTAINING PLANTS

[75] Inventor: Marcel Loncin, Sint-Pieters-Leeuw, Belgium

[73] Assignee: Granimar A.G., Luxemburg, Great Duchy of Luxemburg, Belgium

[22] Filed: Dec. 8, 1972

[21] Appl. No.: 313,384

[30] Foreign Application Priority Data
Dec. 13, 1971   Belgium .............................. 11.1629

[52] U.S. Cl. .................... 127/44, 21/58, 127/46 R, 210/62, 210/64, 424/331
[51] Int. Cl. .......................... C13d 1/02, C13d 1/08
[58] Field of Search ................ 162/161; 210/62, 64; 127/43, 46 R, 44; 21/58; 424/331

[56] References Cited
UNITED STATES PATENTS

| | | | |
|---|---|---|---|
| 2,672,428 | 3/1954 | Sklar | 127/46 R |
| 2,682,487 | 6/1954 | Du Bois | 127/44 |
| 2,802,757 | 8/1957 | Bacon | 127/44 |
| 2,802,768 | 8/1957 | Meuli | 424/331 |
| 3,024,159 | 3/1962 | Bollenback | 162/161 |
| 3,108,907 | 10/1963 | Cucullu | 127/46 R |
| 3,136,716 | 6/1964 | Kitter | 210/64 X |
| 3,193,448 | 7/1965 | Buckman | 21/58 X |
| 3,354,033 | 11/1967 | Buckman | 424/331 X |
| 3,658,700 | 4/1972 | Lederer | 210/64 |
| 3,694,262 | 9/1972 | Casey | 21/58 X |

OTHER PUBLICATIONS

Chemical Abstracts, (I), 51: 18665f (1957).
Chemical Abstracts, (II), 69: 66285c (1968).
Sugar Industry Abstracts, 17: 795 (1955).

*Primary Examiner*—Morris O. Wolk
*Assistant Examiner*—Sidney Marantz
*Attorney, Agent, or Firm*—Sughrue, Rothwell, Mion, Zinn and Macpeak

[57] ABSTRACT

Extraction of sugar from sugar-containing plants, such as sugar beets and sugar cane, by diffusion with water. For inhibiting the development of thermophilous bacteria, iodacetone is added, preferably at a dose of 0.1 to 1 cubic centimeter per ton of treated plants, to the water introduced or recycled into the sugar extractor or to the sugar juice prior to the final sugar crystallization step.

16 Claims, No Drawings

PROCESS FOR EXTRACTING SUGAR FROM SUGAR-CONTAINING PLANTS

DESCRIPTION OF THE PRIOR ART

The extraction of sugar from sugar-containing plants is generally effected by means of water at a temperature comprised between 60° and 80°C, preferably between 70° and 75°C. Under these conditions, a noxious development of thermophilous bacteria occurs. Such a bacterial development has several drawbacks, such as, on the one hand, the destruction of an amount of sugar which frequently exceeds 1% of the quantity of sugar contained in the plants and, on the other hand, changes of the permeability of the mass to be subjected to the extraction of sugar, such changes causing obstructions or preferential passages.

Generally, these drawbacks are avoided by adding 100 to 400 grams of commercial formaldehyde (containing about 40% of $CH_2O$) per ton of beets or juice [see namely J. DUBOURG: La sucrerie de betteraves Edt. Bailliere, Paris (1952); P. BIBAN, et al.: Industr. alimen. agr. no. 82 pp. 699 to 708 (1965); J. GUERIN: Industr. alim. agr. no. 87 pp. 821 to 825 (1970)]

Other bacteriostatic agents, such as quaternary ammonium compounds or halogenated acetic acid esters, have been tested, but it has been found that these agents do practically not inhibit the development of thermophilous bacteria. In fact, whereas the bacteriostatic activity of formaldehyde increases with temperature, the bacteriostatic activity of said other agents is only slightly influenced by an increase of temperature which may even cause the destruction thereof.

DETAILED DESCRIPTION OF THE INVENTION

It has now been found that iodacetone ($CH_3$—CO—$CH_2I$) has an inhibiting activity which is equal to 500 times that of formol (40% of $CH_2O$) in respect of thermophilous bacteria. Under pratical conditions, at concentrations of less than 1 part per million, iodacetone inhibits the development of all thermophilous bacteria under the conditions of the extraction of sugar from beet sugar. This fact is surprising and unexpected, in view of the extreme variety of thermophilous bacteria which are present and in view of the very large bacterial populations which may exceed locally 1,000,000 living cells per cubic centimeter.

The fact in question is even more surprising in view of the fact that the activity of iodacetone, as disclosed by E. SIMON [Biochemische Zeitschrift, no. 253, P. 248 (1932)], appears only in respect of the production of $CO_2$ by yeast at concentrations of 200 parts per million. From the yeast fermentation inhibiting activity of a dose of 200 parts per million of iodacetone, it could certainly not been suspected that the same product could have any inhibiting action on the growth of morphologically and physiologically very different microorganisms, such as thermophilous bacteria, at considerably lower concentrations.

This invention relates therefore to a process for extracting sugar from sugar containing plants by diffusion, said process being characterized by the fact that iodacetone is used as inhibitor of the development of thermophilous bacteria. Iodacetone is preferably used at a dose of 0.1 to 1 cubic centimeter per ton of treated plants.

It is also preferred to add an emulsifying agent and possibly a solvent to the iodacetone, in order to improve the dispersion thereof in the diffusion medium.

As emulsifying agents, it is possible to use, within the scope of this invention, non-ionic surface active agents, such as the products of the condensation of alkylene oxides, such as ethylene oxide or propylene oxide, with alkylphenols or aliphatic alcohols, these products being possibly sulphated. The non-ionic surface active agents sold under the trademark PLURONIC are examples of emulsifying agents which can be used.

The amount of emulsifying agent is preferably of at least 25% by volume of the iodacetone.

In respect of the solvents which may used in accordance with this invention, in order to improve the storing stability of the mixture of iodacetone and emulsifying agent, organic polar solvents, such as aliphatic alcohols, acetone and propylene glycol may be used. The amount of solvent may vary within wide limits; it is practically sufficient to use an amount of solvent, such as methanol or ethanol, for obtaining a stable solution of iodacetone and emulsifying agent.

The additive of iodacetone to the water used for extracting sugar from sugar-containing plants by diffusion, possibly in the presence of an emulsifying agent and/or a polar solvent, may be made totally to the water introduced in the extractor. It is also possible to add the iodacetone to the content of the extractor at the bacterial infection centers. It is preferred to add iodacetone to the recycled water obtained from the compression of sugar beet pulps or sugar cane bagasse or to the sugar extracting juice prior to the final sugar crystallization step.

The iodacetone may be added in a continuous or discontinuous manner.

The following example illustrates the process according to this invention.

EXAMPLE

In a diffusor of the DESMET type capable of treating 3,000 tons of sugar beets per day, it was only possible, according to the known procedure, to avoid substantially the development of thermophilous bacteria by using a daily dose of about 600 liters of commercial formaldehyde (40% of formaldehyde).

On the contrary, by using, in accordance with this invention, 1.45 liters of iodacetone per day, a substantially improved bacteriological purity has been obtained.

It can thus be seen that this invention allows the use of a drastically lower amount of inhibiting agent (1.45 liters of iodacetone in place of 600 liters of commercial formaldehyde) and that the inhibition of bacterial development is far better than that obtained by the previously known method.

What is claimed is:

1. In a process for extracting sugar from sugar-containing plants by diffusion with water, wherein the improvement comprises adding iodacetone as inhibiting agent for the development of thermophilous bacteria to the diffusion water.

2. A process according to claim 1, wherein iodacetone is used at a dose of 0.1 to 1 cubic centimeter per ton of treated plants.

3. A process according to claim 1, wherein an emulsifying agent a solvent is added to the iodacetone, in order to improve the dispersion thereof in the diffusion media.

4. A process according to claim 3, wherein a nonionic surface active agent is used as emulsifying agent.

5. A process according to claim 3, wherein at least 25% by volume of emulsifying agent, based on the iodacetone, is added to iodacetone.

6. A process according to claim 1, wherein an organic polar solvent is used as solvent for the iodacetone.

7. A process according to claim 6, wherein the organic polar solvent is a polar solvent selected from the group consisting of aliphatic alcohols, acetone and propylene glycol.

8. A process according to claim 1, wherein the iodacetone is added to the water introduced in the extractor.

9. A process according to claim 1, wherein the iodacetone is added to the content of the extractor at the bacterial infection centers.

10. A process according to claim 1, wherein the iodacetone is added to the recycled waters obtained from the compression of sugar beet pulps or sugar cane bagasse.

11. A process according to claim 1, wherein the iodacetone is added to the sugar extraction juice prior to the final sugar crystallization step.

12. A process according to claim 1, wherein the iodacetone is added to the water coming from the pulp or bagasse press during the recycling of said water into the extractor.

13. A process according to claim 1, wherein the iodacetone is added in a continuous and regular manner.

14. A process according to claim 1, wherein the iodacetone is added in a discontinuous manner.

15. A process according to claim 1 wherein the sugar-containing plant is either sugar beets or sugar cane.

16. A process according to claim 4 wherein the nonionic surface active agent is a product of the condensation of an alkylene oxide with an alklphenol or with an aliphatic alcohol.

* * * * *